Figure 10:
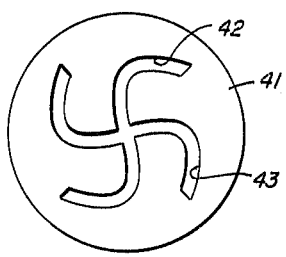

Sept. 7, 1965          H. F. WEBSTER          3,205,392
BRILLOUIN BEAM FORMING APPARATUS
Filed April 1, 1960          2 Sheets-Sheet 1
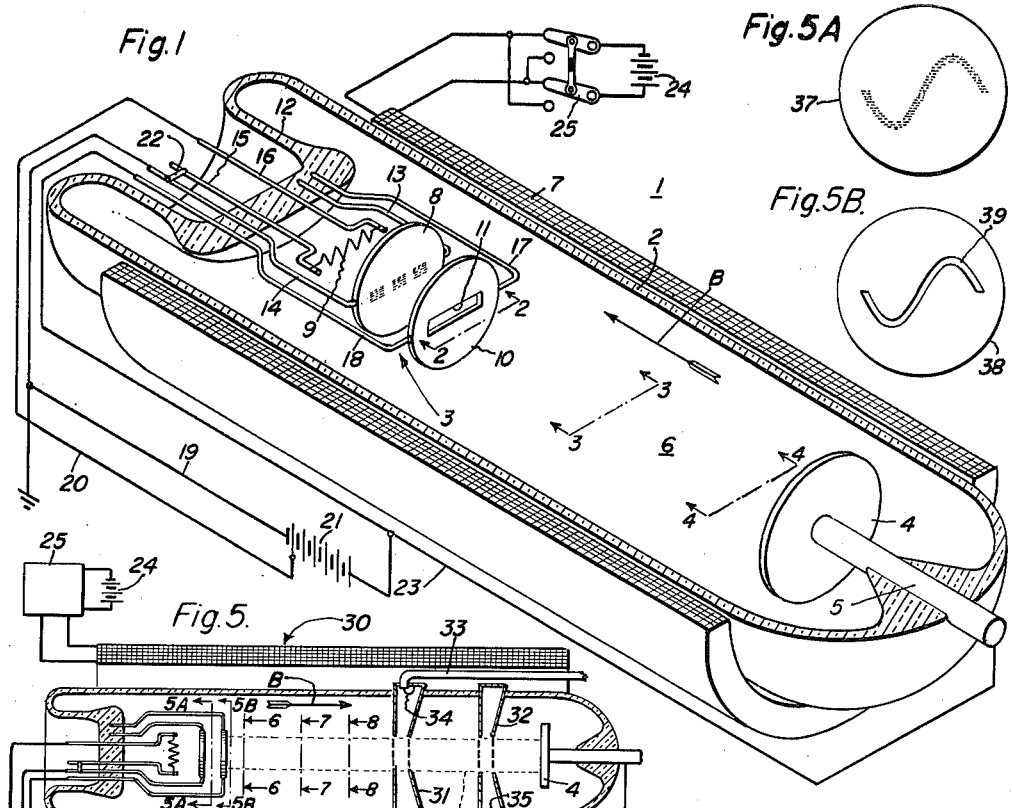
Inventor:
Harold F. Webster,
by Karl A. Ohralik
His Attorney.

Sept. 7, 1965  H. F. WEBSTER  3,205,392
BRILLOUIN BEAM FORMING APPARATUS
Filed April 1, 1960  2 Sheets-Sheet 2

Inventor
Harold F. Webster,
by Karl A. Ohralik
His Attorney.

United States Patent Office 3,205,392
Patented Sept. 7, 1965

3,205,392
BRILLOUIN BEAM FORMING APPARATUS
Harold F. Webster, Scotia, N.Y., assignor to General
Electric Company, a corporation of New York
Filed Apr. 1, 1960, Ser. No. 19,397
3 Claims. (Cl. 313—86)

My invention relates to an electron beam producing apparatus and more particularly relates to an apparatus for inducing Brillouin flow in electron beams.

Brillouin flow or a Brillouin beam is an electron beam having a circular cross section which has constant charge density throughout and in which the individual electrons in the beam have constant angular velocity about and uniform forward velocity along, the beam axis. Such a beam possesses many desirable properties and is useful or advantageous in many applications. For example, this beam carries the largest amount of current that can be held in equilibrium by a given magnetic field.

In producing a Brillouin beam in accordance with conventional techniques, the beam is projected from a thermionically emissive cathode into a region of an axial magnetic field. A magnetic shield is necessarily interposed between the cathode and the axial magnetic field region to shield the electron gun from the field and a radial magnetic field in the region of the shield is effective to impart an orbital component of velocity to the electrons as they traverse this radial component of field. In accordance with this arrangement, however, it is necessary to critically align the opening in the magnetic shield with both the emissive cathode and the axial magnetic field through which the electrons are projected. The complexities of providing the magnetic shield and radial magnetic field as well as the difficulties of obtaining and maintaining this alignment are distinct disadvantages of such prior techniques.

It is accordingly a principal object of my invention to induce Brillouin flow in an electron beam without the necessity of providing either a magnetic shield or a radial component of magnetic field in the path of electron flow and without any critical conditions for an applied magnetic field.

It is a further object of my invention to facilitate the production of a plurality of beams in Brillouin flow from a single cathode to the collector electrode of a tube.

In accordance with my invention, the Brillouin flow in a single beam or multiple beams is induced by projecting a beam of electrons into a region having an axially directed magnetic field and in which the initial contour of the cross section of the beam is made to have points of inflection. A beam with such characteristics is effective by interaction with the axial magnetic field to progressively develop into a Brillouin beam along the length of the tube. The differential charge intensity in a region of the beam or a curve inflection of a cross-sectional beam contour, is effective to produce a differential electric field acting on electrons in the beam, the effect of which is to urge the electrons to move in a direction such that the Lorentz forces on the electrons by reason of the presence of the magnetic field, impart a composite orbital and radial movement thereto. The forces producing these motions are progressive and regenerative whereby, once initiated, Brillouin beam characteristics are rapidly realized. In the case of a beam having an initial contour with a point of inflection, that is, a point at which the curvature changes in sign, by proper direction of the magnetic field, electric fields acting on electrons about such a point urge the electrons to move in a direction such that Lorentz forces on the electrons impart an orbital movement thereto. The extent to which the electrons emitted from the cathode assume Brillouin flow conditions is affected by the length of the drift region, the axial magnetic field intensity, the current density of the beam and a term, $\lambda$, defined as the separation distance between points of inflection or between areas of high electron concentration, as the case may be.

It has been determined that in general, for satisfactory Brillouin beam formation in accordance with any of the embodiments of invention disclosed herein, the thickness of the beam should be less than $\lambda/5$. The growth rate of the beam, or in other words, the rate at which the electrons assume Brillouin beam conditions is expressed by the equation:

$$R = \exp\left(\frac{Z}{L}\right)$$

in which:

Z is the distance of travel of the beam and
L is expressed by the equation:

$$L = \frac{\epsilon_0 v \beta \lambda}{\pi \sigma}$$

and in which:

$\epsilon$ is the dielectric constant of free space
$v$ is the electron beam velocity in meters per second
$\beta$ is the magnetic field strength in webers per square meter
$\lambda$ is expressed in meters
$\sigma$ is the sheet charge density of the beam in coulombs per square meter It is to be observed that the rate of the beam formation is increased by decrease of values $v$, $\beta$ and $\lambda$ in the numerator of the equation expressing L. However, as a practical matter, these terms may not be reduced beyond certain values. This is obvious since to have any beam at all, $\lambda$, the term expressing the cross sectional length of the beam must be greater than zero, the magnetic field ($\beta$) can not be reduced to zero since it is necessary for also collimating the beam and the beam must have a forward velocity ($v$) toward the collector. An optimum value may be reached for all of these terms at which Brillouin beam formation is rapidly realized.

The novel features believed characteristic of my invention are set forth in the appended claims. The invention itself, together with further objects and advantages thereof, may best be understood with reference to the attached drawing in which:

FIGURE 1 illustrates in perspective view, an electron tube apparauts in which Brillouin beams may be formed, FIGURES 2, 3 and 4 are cross-sectional views taken along lines 2—2, 3—3 and 4—4 in FIGURE 1 and illustrating the progressive formation of a Brillouin beam along the drift space of the gun, FIGURE 5 illustrates a klystron type of electric discharge device in which a Brillouin beam is induced by an anode according to an embodiment of my invention and having an opening of substantially sinusoidal contour, FIGURE 5A illustrates a cross-sectional view taken along lines 5A—5A in FIGURE 5 showing the cathode electrode coating, FIGURE 5B illustrates an alternate form of anode according to my invention utilized in FIGURE 5.

Figure 16:
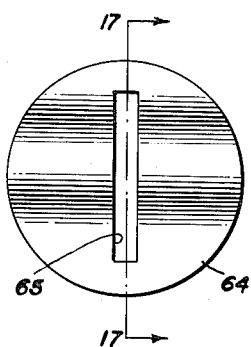
Figure 17:
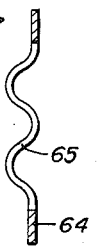
Figure 18:
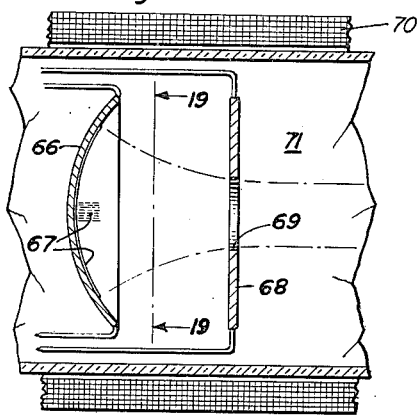
Figure 19:
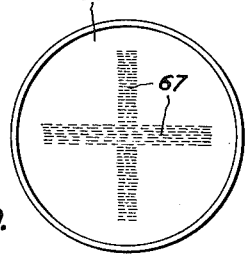

FIGURES 6, 7 and 8 illustrate cross-sectional views of the beam in the device of FIGURE 5 taken along lines 6—6, 7—7 and 8—8, respectively, and correspond to FIGURES 2, 3, and 4 respectively, FIGURE 9 is a cross-sectional view corresponding to section 8—8 of a beam formed in the discharge device of FIGURE 5, wherein the magnetic field is opposite to that shown in FIGURE 5, FIGURES 10, 11, 12, 13, 14, 15, 16 and 17 represent views of alternate forms of anodes effective to induce Brillouin beam flow in an electric discharge device shown in either FIGURE 1 or FIGURE 5, FIGURE 18 is a detail view showing a partial view of an electron tube structure incorporating a cathode structure having cross concave sections of electron emission enhancing material according to another embodiment of my invention, and FIGURE 19 is a view taken along section 19—19 of FIGURE 18 and illustrating in detail the coating of emission enhancing material on the cathode of FIGURE 18.

Referring now more particularly to FIGURE 1 of the drawings, 1 designates generally an electron tube apparatus in which Brillouin beams may be formed according to my invention. Apparatus 1 includes an elongated, evacuated envelope 2 made of glass or other suitable material. An electron gun designated generally at 3 is mounted at one end of envelope 2 for producing an electron beam. For collecting electrons from the beam an electron collector electrode 4 is disposed at the other end of the envelope. A conductive member 5 supports the collector 4 and extends through the envelope for facilitating external electrical connections thereto. The space between the gun 3 and collector 4 is designated as a drift space 6 along which the electrons travel between gun 3 and collector 4. The drift space 6 is permeated with an axial magnetic field represented by the arrow B and produced by an electromagnetic coil 7 surrounding the envelope 2 and being substantially coextensive with it.

For producing a beam of electrons, the electron gun 3 includes a cathode electrode 8, a heater 9 is disposed in proximity to the cathode on one side thereof for raising the cathode to electron emission temperature and an anode electrode 10 having a rectangular aperture 11 interposed between the cathode 8 and collector 4. The cathode 8 is provided with a coating of electron emission enhancing material along a projection of opening 11 on the cathode and the coating is applied unevenly so as to be relatively heavily concentrated in three areas with lesser concentration in area intermediate to these three. It is to be understood, however, that the three areas of concentrated coating are exemplary only and that one or more such areas are contemplated in accordance with my invention. Accordingly, under the influence of an electric field between anode 10 and cathode 8, a beam of electrons having a cross-sectional density distribution similar to the density distribution of emission enhancing materal on cathode 8 will be emitted and will pass through opening 11 as shown clearly in FIGURE 2 depicting a view along lines 2—2 of FIGURE 1.

The cathode electrode is supported on a reentrant stem 12 of the envelope 2 by a pair of rod supports 13 and 14, the rod 14 being conductive and extending through the stem for suitable external electrical connections to the cathode. Heater 9 is supported by and supplied with electrical energy through a pair of conductive rod supports 15 and 16 extending through stem 12 for external electrical connections and similarly, anode 10 is supported by rods 17 and 18, rod 18 being conductive and extending through the stem for external electrical connections.

For operation of the apparatus 1, electrical energy is supplied to heater 9 through leads 19 and 20 from a source of electrical energy represented by a battery 21. Cathode 8 is maintained at ground potential by the interconnection at 22 of prong 15 with prong 14, which in turn is grounded. A high positive potential with respect to cathode 8 is applied to anode 10 from the source 21 and to collector 4 from the source 21 through a lead connection 23. Since equal potentials are applied to anode 10 and collector 4, the region 6 therebetween is essentially electric field free whereby the electrons in this region merely drift therethrough and are not under the influence of any accelerating forces due to external applied electric fields. For energizing coil 7 to provide the axial magnetic field represented by arrow B, a direct potential source represented by a battery 24 is connected to the terminals of the coil through a reversing switch 25 whereby the energizing current and therefore, also the direction of the magnetic field may be reversed.

In response to application of the potentials as shown in FIGURE 1 of the drawing and described hereinabove, the cathode 8 emits electrons which are attracted to the anode 10. The aperture 11 in anode 10 permits the passage into drift region 6, of electrons along the contour of the aperture 11. As shown in FIGURE 2, representing the sectional view taken along lines 2—2, of FIGURE 1, the distribution of electrons upon emergence from the aperture 11 is substantially as the distribution of electron emission enhancing material on cathode 8. That is to say, the electron distribution includes three areas 26, 27 and 28 of relatively high density, separated by regions of lesser electron density.

In the beam as shown in FIGURE 2 of the drawings, the mutual repulsion between the electrons produces electric field forces thereon tending to move the same laterally away from the regions of high density or in other words, transverse to the direction of the magnetic field $\beta$. As is well known, such transverse movement of electrons produces Lorentz forces thereon by reason of the interaction between the magnetic field produced by the moving electron and the applied field $\beta$, producing or urging movement of the electron at right angles to both the electric and applied magnetic fields which affect the electron. As an example, as shown in FIGURE 2, an electron in area 26 near an outer portion thereof has an electric field acting thereon tending to move the same toward area 27, in the direction of the arrow designated $kEe$, wherein E represents the electric field acting on any electron, $e$ represents the electron charge and $k$ is a suitable constant. As such electron begins movement in this direction, a force proportional to the product of its velocity and the magnitude of magnetic field $\beta$ acting in the direction of the arrow designated $cv\beta$ acts on it, wherein $\beta$ represents the magnetic field strength, $v$ represents the electron velocity and $c$ represents a suitable constant. In a similar manner, other electrons in regions 26, 27 and 28 have electric magnetic field forces acting thereon as they drift along the region 6. The Lorentz forces on electrons are always at right angles to the applied magnetic field and thus, each electron follows a curved path when projected on a plane perpendicular to the tube axis. Substantially all of the electrons in the beam are affected in a similar manner to some extent. As shown in FIGURE 3, representing a cross-sectional view of the beam at section 3—3, the result of the aggregate action of the beam electrons is to produce a beam 29 having three generally circular areas of high electron density in which Brillouin beam conditions are approached. That is, the bulk of the electrons have a substantially uniform angular motion about an axis along the tube. About these three areas remain a number of electrons on which the mentioned combined fields continue to act and which at a more advanced location along the tube will also assume positions in one of the three beams. This is shown more clearly in the beam 29A in FIGURE 4 of the drawings representing a view along section 4—4 of FIGURE 1 wherein a much greater proportion of the electrons are in the beams and in Brillouin conditions.

The embodiment described thus far in connection with FIGURES 1 through 4 is set forth and claimed in my copending divisional application Serial No. 418,575, filed October 30, 1964, entitled "Brillouin Beam Forming Apparatus" and assigned to the assignee of the present invention.

The present invention is particularly applicable in high power high frequency devices such as klystrons and traveling wave tubes in that Brillouin beams can provide higher charge densities than any other type of beam whereby higher energies may be obtained for the each beam potentials.

The manner in which an anode construction according to another embodiment of my invention may be useful to provide a Brillouin type beam in a multi-cavity klystron is illustrated in FIGURE 5 of the drawings. In this figure an electric discharge device 30 similar to that at 1 in FIGURE 1 is provided with the addition of a pair of spaced resonant cavities 31 and 32 having central apertures covered with grids to provide aligned gaps through which the electron beam passes in traveling between the cathode and collector of the tube. Cavity 31 may be excited by an input signal introduced by a coaxial cable 33 having its inner conductor formed in a coupling loop 34 and output energy may be abstracted from cavity 32 by a coupling loop 35 connected to the inner conductor of a coaxial cable 36. The operation of the klystron except for the Brillouin beam formation is conventional and well known and forms no part of the present invention. Accordingly a detailed description thereof is herein deemed unnecessary.

In accordance with a feature of my invention, a cathode electrode 37, as shown more clearly in FIGURE 5A, is provided with an electron tube and an anode electrode 38, as shown more clearly in FIGURE 5B, is interposed between the cathode and collector. The anode is provided with a sinuous opening 39 of substantially one complete cycle and cathode 37 is coated with electron emission enhancing material along a sinuous area corresponding to the projection of opening 39 on the cathode. As interposed in the path of the electron beam from the cathode to the collector, the anode 38 admits into the drift region 6, a beam 40 having such a sinusoidal cross-sectional contour. In this beam the electron density is as uniform throughout as is practicable, without any material or substantial localized concentration of electrons. A rigorous mathematical analysis will show that in the beam 40 as shown in FIGURE 6 of the drawings, electric fields exist as shown by the arrows therein by reason of the contour of the electron beam. The effect of these forces is to urge movement of the electrons transverse to the tube axis so that Lorentz forces are produced thereon by the interaction between the applied magnetic field and the magnetic field produced by the moving electron. The effect of such forces is to progressively distort the beam and as shown in FIGURE 7, representing a cross-sectional view of the beam at a location 7—7 in FIGURE 5, concentration of electrons occurs in the region about the point of inflection of the initial beam 40, with a consequent reduction in density of the beam in other portions of the beam. This action is progressive along the tube length and at section 8—8, as shown in FIGURE 8 of the drawings, the bulk of the electrons in the beam assume Brillouin flow conditions and a small proportion remain about such a beam. It is significant to note with respect to this embodiment of my invention that the Brillouin beam is formed about the point of inflection of the beam and that no initial non-uniform electron density in the beam is required. It is also to be noted that in this embodiment of my invention, a reversal of the direction of magnetic field $\beta$ is effective to produce Brillouin beam flow about the end points of the curve. This is shown in FIGURE 9 of the drawings representing the beam at an advanced point in tube 1, corresponding to section 8—8 in FIGURE 5. In general, with beams of initially curved cross-sections, the Brillouin beams form about certain points of inflection of the curve. The particaular points depend on the change of sense of the second derivative of the curve and the direction of magnetic field. In the case of a sinusoidal curve the Brillouin beams form around one group of alternate points of inflection for one direction of the magnetic field while for a reversed application of magnetic field, the Brillouin beams form around the other alternate points. In the case of anode 38, the midpoint of sinusoidal opening 39 is one point of inflection while the extremities of the curve correspond to the other points of inflection at which the change in curvature is in a direction different from that at the midpoint.

In accordance with a modification of my invention, the anode electrode in tubes 1 and 30, may be as shown at 41 in FIGURE 10 of the drawings which has a pair of intersecting sinusoidal apertures 42 and 43 for admitting electrons from the cathode into the drift space 6. The action in forming the Brillouin beam in this case is similar to that described herein above with respect to the embodiment using anode electrode 38, with the exception, of course, that the number of electrons is substantially increased by admitting additional electrons through the second aperture. It is also to be noted that, depending on the direction of the applied magnetic field, the number of Brillouin beams that may be formed by using the anode electrode 41 is either one or five. In the former case, a single beam will be formed at the projection of the intersection of two curved apertures for one direction of the applied field and in the latter case a beam will be formed at the projection of this intersection and at the projection of each of the extremities of the curves.

Figure 11:
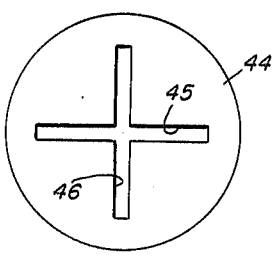
Figure 12:
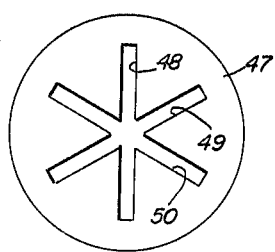
Figure 13:
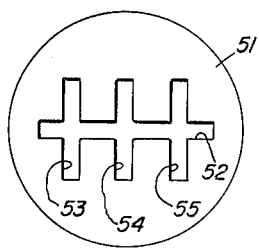

Further embodiments of anode electrodes are shown in FIGURES 11, 12 and 13 of the drawings which include straight or rectangular apertures intersecting each other. In FIGURE 11 in the anode 44, two straight apertures 45 and 46 are shown intersecting each other at right angles and in this case a predominant Brillouin beam will be formed at the projection of the intersection of these two apertures for one direction of the applied magnetic field. In a reverse direction of the applied magnetic field a similar Brillouin beam is formed at the projection of the intersection of these two apertures but the direction of orbital movement of the electrons in the beam is reversed. In the case of the anode electrode 47 shown in FIGURE 12 three intersecting apertures 48, 49 and 50 again facilitate formation of a predominant Brillouin beam at the center of the projection of the apertures for one direction of the magnetic field and in the other direction of the magnetic field a similar beam is again formed at the intersection of these apertures but the direction of electron orbital movement is again reversed. In the case of the anode electrode 51 as shown in FIGURE 13 of the drawings one rectangular aperture 52 is intersected by three apertures 53, 54 and 55 and the Brillouin beams are formed in a row at the projections of the intersections of the respective apertures for one direction of the magnetic field and in the other direction of the magnetic field similar beams are again formed with reversed orbital movement of the beam electrons. The anode electrodes in FIGURES 11, 12 and 13 are particularly useful where high power is desirable in a discharge tube and is difficult or impossible to obtain a single beam.

With respect to the embodiments of anode electrode shown in FIGURES 11, 12 and 13 of the drawings, it should be noted that Brillouin beam formation at the projections of intersections of the anode apertures are readily explainable as being induced by symmetric electric fields formed about this region as a point of symmetry.

Figure 14:
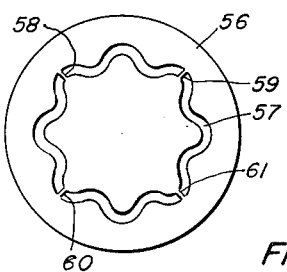

Still a further embodiment of anode electrode according to my invention is shown at 56 in FIGURE 14 of the drawings wherein an aperture 57 for admitting electrons from a cathode to the drift region of tube 1 or 30 may be of a generally sinusoidal character but extending completely about the anode electrode in a closed curve. The portion of the anode 56 within the closed aperture 57 is physically supported by a plurality of ribs 58, 59, 60 and 61 located at crests of the aperture curve. For any one direction of applied magnetic field in a tube, for minimum interference with the electron beam, such ribs would most appropriately be at the non-favored points of inflection of the aperture. However, since such locations would become favored points of inflection for a reversed magnetic field, the crest locations of the curve are the best compromise location therefor. In accordance with this construction of anode the electrons are admitted into the drift region substantially in a contour of the aperture 57 and as hereinabove explained with respect to the anode 38, the Brillouin beams are formed at certain points of inflection on the aperture 57 depending upon the direction of the applied magnetic field. That is to say, alternate points of inflection about the aperture 57 have Brillouin beams formed in response to one direction of the applied magnetic field and the other alternate points of inflection have Brillouin beams formed for the other direction of the applied magnetic field. It is again to be noted that in accordance with this embodiment of the invention, a large number of beams may be obtained to achieve high power which may not be achieved in a single electron beam.

Figure 15:
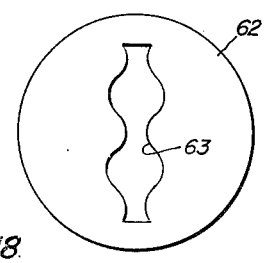

In accordance with still another embodiment of my invention as shown in FIGURE 15 of the drawings, an uneven distribution of electron density may be obtained by the anode as shown at 62 in this figure. According to a feature of my invention, the anode 62 is provided with an aperture 63 which is of uneven width along its length whereby in response to a potential applied to this anode with respect to the cathode in either of tubes 1 or 30, an uneven electric field distribution between the cathode and the different points along the aperture 63 is established. Accordingly, a beam of uneven electron density is produced emerging from the anode aperture 63. By the processes described with respect to the anode 10 cooperating with the cathode 8, having an uneven distribution of the electron emission enhancing material, the anode 62 is effective to incite Brillouin beam formation.

In a manner somewhat similar to that described with respect to the anode 62 in FIGURE 15 of the drawings, a Brillouin beam may be established by an anode 64, as shown in FIGURES 16 and 17 of the drawings. In accordance with a feature of this embodiment of invention the surface of the anode is corrugated and apertured at 65 whereby portions defining the aperture thereof are nearer to the cathode than other portions when mounted in either of tubes 1 or 30. By reason of the variable spacing between the cathode and different portions of the anode, an uneven electric field is established between these two electrodes. Accordingly, an uneven distribution of electrons in the beam emerging from the aperture 65 in the anode 64 is produced. In a manner similar to that described hereinabove with respect to the anode 10 cooperating with the cathode 8, Brillouin beam formation is incited at projections of such electron concentrations.

In accordance with still another embodiment of my invention as shown in FIGURES 18 and 19 of the drawings, a cathode 66, of generally dish shape, may be provided in either of tubes 1 or 30 in place of the cathodes shown in these figures. Electron emission enhancing material may be applied thereto in the general contour of a cross as shown in both FIGURES 18 and 19 at 67. For providing an accelerating electric field for the electrons so emitted, an anode electrode 68 having a circular aperture 69 for accommodating the beams is spaced from the cathode. An axial magnetic field is supplied by an electromagnetic coil 70. In other respects, the tube in which the cathode 66 is utilized, may be similar to either tube 1 or tube 30. Accordingly, it is neither fully shown nor described in detail.

In the operation of the tube with a cathode 66, a positive potential applied to the anode 68 is effective in producing an electron beam in a drift space 71 which has cross-sectional contour of a cross. In a manner similar to that described with respect to the anode of FIGURE 11 employed in a tube 1 or 30, Brillouin beam formation may be incited with use of the cathode 66 and electrode 68.

From the foregoing description it is apparent that I have provided a novel apparatus for inciting Brillouin beam flow in electron tubes. The advantages of forming one or more Brillouin beams which contain high charge densities for use in certain electron tube devices facilitates high energy beams with smaller beams potentials and smaller tube structures.

While the present invention has been described by reference to particular embodiments thereof, it will be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. An apparatus for producing an electron beam having a uniform electron density and in which the individual electrons have a uniform angular velocity about an axis and a uniform translational velocity along the axis comprising means including a cathode and an anode for projecting a beam of electrons having a curved cross-section with a point of inflection in the curve into a drift region provided between said anode and a collector electrode, the cross-sectional dimension of said beam in one direction being less than one-fifth of the cross-sectional dimension thereof in a direction generally perpendicular to said one direction and means applying a magnetic field having flux lines substantially parallel to said beam in said drift region and in the region between said anode and said cathode.

2. An apparatus for producing an electron beam having a uniform electron density and in which the individual electrons have a uniform angular velocity about an axis and a uniform translational velocity along the axis comprising a cathode, a surface of said cathode being coated with electron emission enhancing material, a collector electrode spaced from said cathode and an anode interposed between said cathode and said collector, said anode having an aperture in the contour of a sine wave, means applying a direct potential to said anode and to said collector positive with respect to said cathode whereby electrons emitted from said cathode are projected through the aperture in said anode and travel toward said collector, and means permeating the region between said anode and said collector in a direct magnetic field.

3. An apparatus for producing an electron beam having a uniform electron density and in which the individual electrons have a uniform angular velocity about an axis and a uniform translational velocity along the axis comprising a cathode, a surface of said cathode being coated with electron emission enhancing material, a collector electrode spaced from said cathode and an anode interposed between said cathode and said collector, said anode having a curved aperture with a point of inflection, means applying a direct potential to said anode and to said collector positive with respect to said cathode whereby electrons emitted from said cathode are projected through the aperture in said anode and travel toward said collector, and means permeating the region between said anode and said collector in a direct magnetic field.

References Cited by the Examiner

UNITED STATES PATENTS

| | | | |
|---|---|---|---|
| 2,643,353 | 6/53 | Dewey | 315—3.6 X |
| 2,752,523 | 6/56 | Goodall | 313—84 |
| 2,776,389 | 1/57 | Peter | 315—3.6 X |
| 2,782,334 | 2/57 | Gardner | 313—346 X |
| 2,812,467 | 11/57 | Kompfner | 315—3.5 |
| 3,034,012 | 5/62 | Gasson | 313—82 X |

GEORGE N. WESTBY, *Primary Examiner.*

RALPH G. NILSON, *Examiner.*